Oct. 11, 1938.         O. E. WOLFF         2,133,260
MACHINE FOR STACKING SHEET MATERIAL
Original Filed Oct. 7, 1935    3 Sheets-Sheet 1

INVENTOR
Otto E. Wolff
BY
David Rines
ATTORNEY

Oct. 11, 1938.   O. E. WOLFF   2,133,260
MACHINE FOR STACKING SHEET MATERIAL
Original Filed Oct. 7, 1935   3 Sheets-Sheet 2

Inventor
Otto E. Wolff
by David Rines
ATTORNEY

Oct. 11, 1938.    O. E. WOLFF    2,133,260
MACHINE FOR STACKING SHEET MATERIAL
Original Filed Oct. 7, 1935    3 Sheets-Sheet 3

INVENTOR
Otto E. Wolff
BY
David Rines
ATTORNEY

Patented Oct. 11, 1938

2,133,260

UNITED STATES PATENT OFFICE 2,133,260

MACHINE FOR STACKING SHEET MATERIAL

Otto Edward Wolff, Arlington, Mass., assignor to Paul S. Bauer, Belmont, Mass., trustee of the R. S. Bauer Trust Original application October 7, 1935, Serial No. 43,928. Divided and this application June 14, 1937, Serial No. 148,125

7 Claims. (Cl. 270—2)

The present invention relates to means for handling sheet material, and more particularly to such sheet material as newspapers and periodicals.

Another object of the present invention is to provide a novel mechanism for accumulating a stack of sheets from below the stack.

Other and further objects will be explained hereinafter, and will be particularly pointed out in the appended claims.

Figure 1:
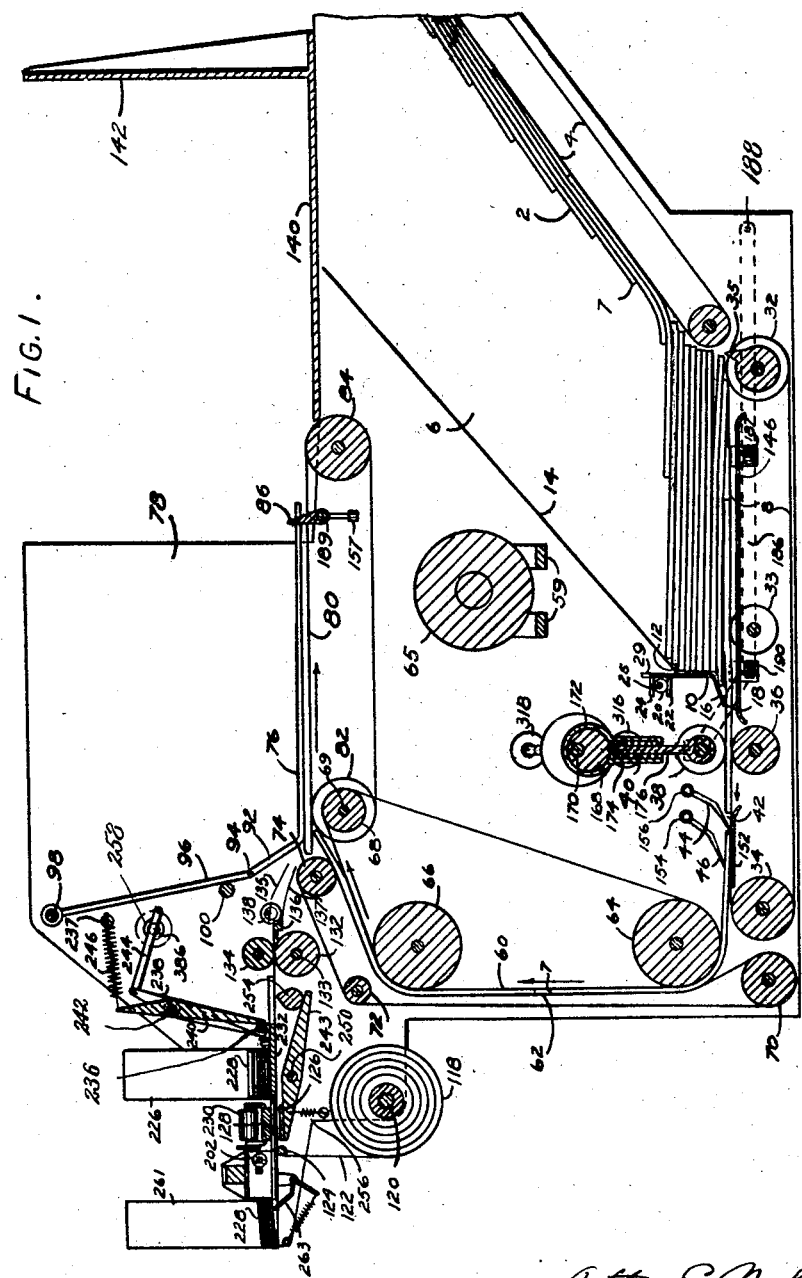
Figure 2:
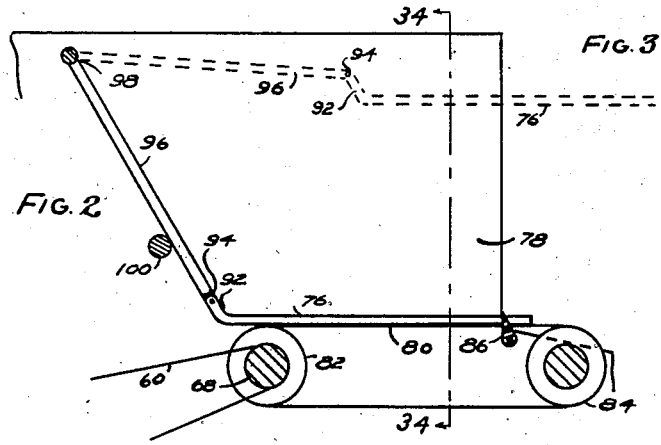
Figure 3:
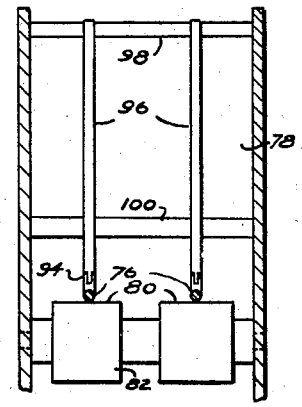
Figure 4:
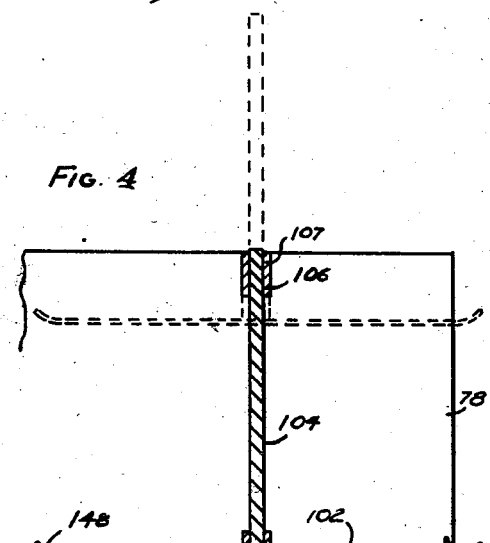
Figure 7:
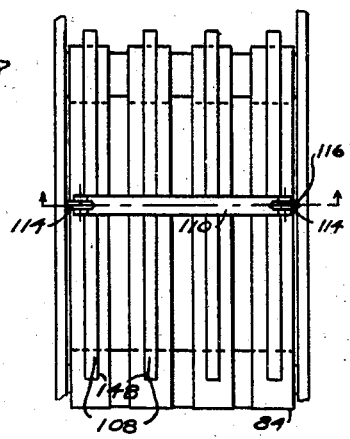
Figure 5:
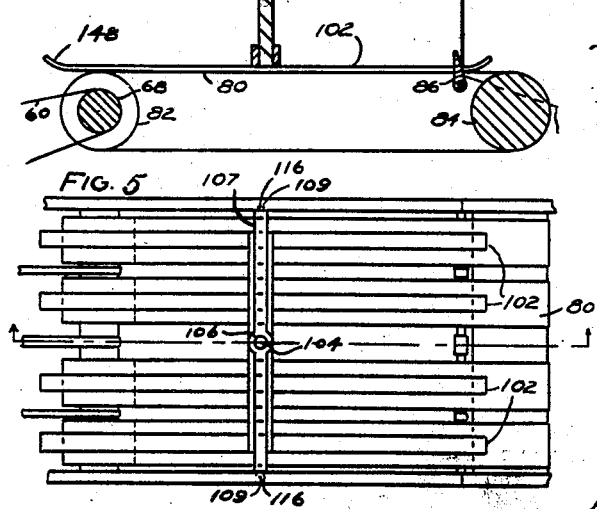
Figure 6:
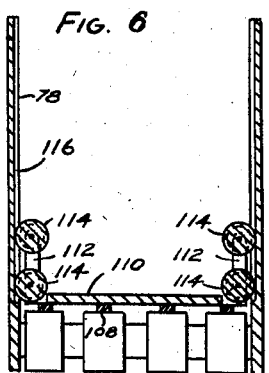
Figure 9:
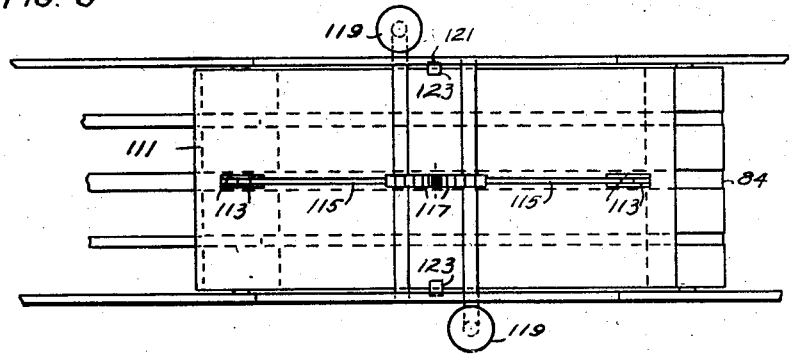
Figure 8:
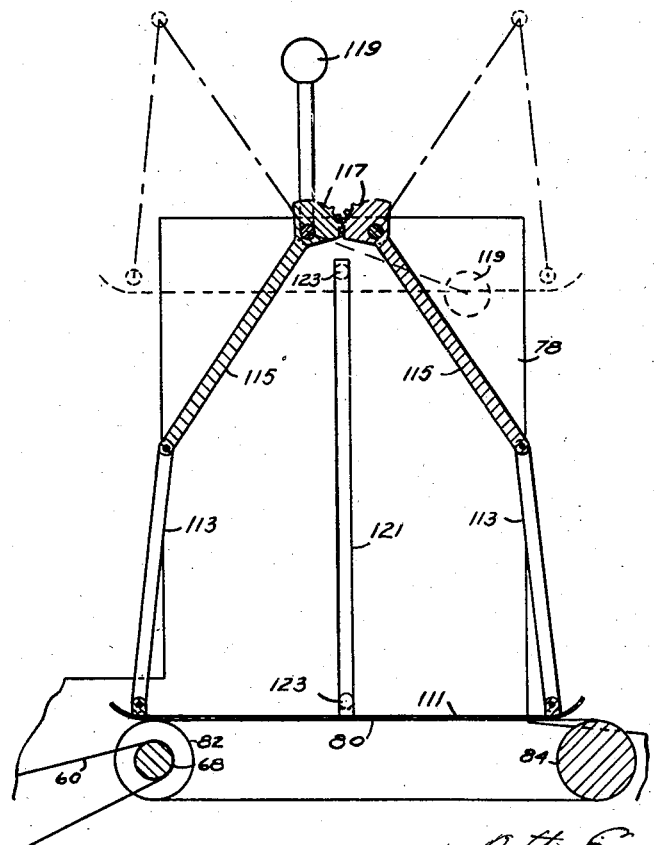

The invention will now be explained in connection with the accompanying drawings, in which Fig. 1 is a longitudinal vertical section of a machine such as is disclosed in a copending application, Serial No. 43,928, filed October 7, 1935, of which the present application is a division; Fig. 2 is a view of the stack hold-down weight illustrated in Fig. 1, shown by full and dotted lines in two different positions; Fig. 3 is a corresponding end view, looking from the right; Fig. 4 is a view corresponding to Fig. 2, showing a modified stack hold-down weight; Fig. 5 is a corresponding plan view; Fig. 6 is a view, corresponding to Fig. 3, of a further modification; Fig. 7 is a corresponding plan view; Fig. 8 is a view, corresponding to Fig. 2, of still a further modification; and Fig. 9 is a corresponding plan.

A plurality of newspapers 2 are shown in Fig. 1 in lapped relation, upon inclined conveyor belts 4 by which they are delivered into a hopper 6, where they become temporarily stacked.

As the first newspaper 2 is delivered by the conveyor belts 4 into a hopper 6, it is carried by horizontally disposed, continuously traveling belts 8, at the bottom of the hopper 6, forward, or toward the left, as viewed in Fig. 1. The second newspaper 2 is similarly carried forward, to the left, on top of the first newspaper 2. The third newspaper 2 is similarly carried forward, to the left, on top of the second newspaper, and so on.

The forward, or left-hand (as viewed in the said Fig. 1) ends of those newspapers 2 that are disposed above the lowermost newspaper or newspapers soon engage a vertically disposed, shield wall 10 that prevents their further progress.

The left-hand end 12 (as viewed in Fig. 1) of a wall 14 is disposed near the upper end of the vertically disposed, shield wall 10, at a point a little higher than the lowest point of the inclined conveyor belts 4. The wall 14 is shown inclining toward the right, substantially parallel, and oppositely disposed, to the said inclined conveyor belts 4. Above the point 12, therefore, the newspapers will become collected in the hopper 6 in an inclined stack between the wall 14 of the hopper 6 and the inclined belts 4. The weight of the stack serves to press the lowermost newspaper 2 against the said horizontally disposed belts 8, at the bottom of the hopper 6.

The lower terminal portion of the vertically disposed, shield wall 10 terminates in a finger 16, disposed very close to the horizontally disposed conveyor belts 8, but raised slightly thereabove, so as to provide a space through which the conveyor belts 8 may feed the lowermost newspaper 2 out of the hopper 6, into the space outside, to the left of the hopper, as shown in Fig. 1.

The space near the belt conveyor 8, under the extremity 18 of the finger 16, should preferably be adjusted so as to be less than the thickness of two newspapers, so that the second newspaper from the bottom shall be caught by the sloping, inner wall of the inclined finger 16, as illustrated more particularly in Fig. 1.

The preferred mechanism for adjusting the position of the finger 16 comprises two eccentrics 20 disposed between two pairs of lugs 22 and 24 that extend horizontally out from the vertically disposed, shield wall 10, at the extreme ends thereof. The eccentrics 20 are pivoted about a shaft 25 to which is fastened an adjusting handle (not shown) that is positioned outside the side frame of the machine. The shield wall 10 will be guided in such vertical movement by ways 29 in the side frames of the machine.

The newspaper or newspapers are passed out of the hopper 6, under the finger 16, by the same conveyor belts 8 before described; and to this end, they extend forward, to the left of the vertically disposed shield wall 10, a considerable distance beyond the confines of the hopper 6. The belts pass over pulleys 32 and 34, and also over an idler roll 33. The right-hand pulley 32 is provided with a plurality of projections 35 for agitating the rear ends of the papers 2 in the hopper 6, as it revolves, thus eliminating the tendency of the papers 2 sticking together in the hopper 6, and also tending to drive the lowest paper 2 to the left, toward the shield 10.

If more than one paper (or the desired other number of papers) should tend to feed past the shield 10, they will become separated by a separating roll 38, which is flexibly spring-pressed against the belts 8 and an idler roll 36 under the belts 8.

After the papers have thus been caused to travel from the conveyor belts 4 into the hopper 6, and from the hopper 6 between the rolls 36 and 38, they are next counted. As soon as the paper has traveled beyond the position occupied by a counting finger 44, it falls into the space 42 between the successive papers 2. Each raising and lowering of the counting finger 44 above a plate 152, about its pivot 156, will result in registering a count an additional counting finger 46, pivoted at 154, and spaced from the counting finger 44 in the line of feed, may be employed, particularly with overlapped newspapers, as described in the said application. The movement of the contact fingers 44 and 46 serves to close an electric circuit for actuating a counter controlled by a magnet 202.

The papers 2 are then transferred to the upper portion of the machine by means of vertically disposed, continuously traveling, lift, conveyor belts 60 and 62.

Conveyor belts 60 pass over two large pulleys 64 and 66 and a smaller pulley 68. The conveyor belts 62 pass over three pulleys 70, 72 and 74. The upper portions of the belt conveyors 60 and 62 are disposed below, and at an upward incline to, the bottom of a magazine 78, so as to convey the newspapers successively to the right, after they leave the pulley 66, at an upward incline, toward the pulleys 68 and 74.

Horizontally disposed, continuously traveling, conveyor stacker belts 80 at the bottom of the magazine 78 pass over horizontally alined pulleys 82 and 84 at the bottom of the magazine 78. The pulley 82 is disposed on the same shaft as, so as to be coaxial with, the pulley 68, under the magazine 78. It is not essential that the belts 8 or 80 be horizontal,—they may be inclined under the hopper 6 or the magazine 78 at an angle.

The papers are thus carried toward a predetermined point of the bottom of the magazine 78, just above the pulley 82, and under the bent portions 92 at the left of a hold-down weight or weights 76, or under the rearward projecting ends of the newspapers 2 in the magazine 78, as illustrated in Fig. 1.

The function of the weight 76 is to press the lowest paper 2 against the conveyor belts 80. This function is not needed in the hopper 6, because of the weight of the papers 2 that are fed in from above the stack. In the magazine 78, however, the papers are fed in by the conveyors 60 and 62 from below.

As the first paper 2 is delivered by the conveyor belts 60 and 62, between the pulleys 74 and 82, it travels at the said upward incline, above the said pulleys 68 and 82, the pulley 82 thus serving as a guide roll.

The front edge 7 of the first newspaper 2 is first gripped between the body portion of the hold-down weight 76, at the point where it joins the bent portion 92, and the portions of the belts 80 immediately beneath. The said front edge 7 is then dragged in by the conveyor belts 80, under the said bent end 92 of the hold-down weight 76. The pulley 84 is disposed beyond the magazine 78, to the right thereof, as viewed in Fig. 1, so that the belt conveyor 80 would carry the papers in the magazine 78 beyond, and to the right of, the magazine 78, on to a table 140, were it not for stops 86 that project upward between the stacker belts 80 to engage the forward end of the lower paper or papers 2 in the magazine 78 and limit its or their further progress. The stops 86 need not project very high, since it is quite sufficient to restrain the travel of only the bottom paper 2 in the magazine 78.

As the newspapers 2 continue to be successively advanced by the belt conveyors 60 and 62, the forward end 7 of each next-following newspaper, as it leaves between the pulleys 74 and 82, enters into the magazine 78 at a point between the pulley 82 and under the rear end of the newspaper already at the bottom of this magazine 78, overhanging, or projecting rearwardly over, the pulley 82, providing a small space for the entering paper 2 to pass between the bottom of the stack of papers and the upper reach of the belts 80. After the first newspaper 2 has been fed into the magazine 78, it will itself serve as such guide for the next-following newspaper, provided that the distance of the stop 86 from the uppermost point of the pulley 82, at the receiving end of the conveyor 78, is less than the length of the newspapers. It need not, however, be a great deal less. The remaining papers in the magazine, above the bottom paper 2, will remain in the magazine, because they are protected from the feeding action of the belts 80 by the lowermost paper in the stack, which is alone in contact with the belts 80, and they are held in the magazine 78 by the hold-down weight 76.

The newspapers 2 are thus fed into the magazine 78 by the combined movements of the lift belts 60 and 62 and the stacker belts 80. The bends in the newspapers during such feeding are influenced by both these sets of belts. It is possible to control the bends, therefore, by different arrangements of the belts, and also to have the newspapers leave the belt conveyors 60 and 62 at a downward incline, as explained in the said application.

The belt conveyors 60 and 62 may be modified by raising the central belts of one of them, and correspondingly lowering the central belts of the other, with respect to the side belts. The papers 2 will then be fed into the magazine 78 concaved or convexed and, therefore, stiffer than when fed into the magazine flat. Such stiffness will prevent all possibility of the unrestrained sections of the papers buckling in the space between the guide roll 82 and the bent portions 92 of the hold-down weight 74 or the rearwardly projecting, tail ends of the sheets in the magazine. The convexity or the concavity need extend only part way under the stack at this point.

It is desirable to have the horizontally disposed conveyor belts 8 travel at a higher speed than the inclined conveyor belts 4, but at a slower speed than that of the lift belts 60 and 62 which, in turn, should travel more slowly than the stack belts 80. The papers 2 will then separate out more rapidly in the hopper 6, and congestion and buckling of the papers 2, that might be caused by slippage between the belts and the papers 2, is avoided. Such slippage is particularly possible in the magazine 78, caused by the drag of the upper papers 2 therein on the lowermost paper 2 as it is fed into the magazine 78. The desired relative speeds may be produced in any desired manner, as explained in the said application, from a motor 65 that is supported in a cradle 59.

The newspapers 2 thus become stacked on the coveyor 80, and the stack in the magazine 78 thus rises higher and higher as the newspapers 2 are thus successively conveyed to the bottom of the magazine and successively fed thereinto, until the desired number of newspapers, as determined by the count of the counting finger 44 or the counting fingers 44 and 46, has been collected in the magazine 78. The weight 76 rises higher and higher during this accumulation of the papers in the magazine 78, so as always to press down upon the top newspaper in the magazine, thus to press the bottom newspaper in the magazine against the conveyor belts 80 during its feeding into the magazine.

To permit such raising of the weight 76, it is shown, in Figs. 1 and 2, as constituted of one or more flat bars, having the integral, angularly bent portion 92 at the left, pivoted at 94 to the lower end of a link 96, the upper end of which is pivoted to the frame of the machine at 98, above and to the left of the newspaper stack in the magazine 78. In the lowermost position of the weight 76, the link 96 engages a stop 100 to limit the degree of movement of the link 96 and, therefore, the weight 76, to the left. The weight 76 is thus prevented from swinging to the left, out of the magazine 78, when it drops to the bottom of the magazine after the stack of newspapers therein has been delivered on to the delivery table 140. In this position, the bent portion 92 serves as a guide for guiding the first newspaper 2, as it is received from the conveyors 60 and 62, in under the hold-down weight 76 and above the conveyor 80. As the stack of papers 2 in the magazine rises, the weight 76 also rises and, at the same time, moves to the right, as illustrated by dotted lines in Fig. 2, actuating the link 96 also to the right, away from the stop 100. The link joint enables the hold-down weight 76 to lie flat on the top paper 2 of the stack no matter what the height of the stack.

A modified hold-down weight is illustrated in Figs. 4 and 5, constituted of one or more flat bars 102, connected with a vertical, centrally disposed, bar 104, restricted to move vertically only in a guide or guides 106, from the lowermost, or full-line position of Fig. 4 to the dotted-line position thereof. The guide or guides 106 are shown as a hole in a cross piece 107 disposed at the top of the magazine 78. The ends of the cross piece 107 are provided with pins 109 that slide in vertically disposed slots 116 in the side walls of the magazine 78, thus preventing the weights 102 from turning about the central bar 104. This hold-down weight 102 has the advantage over the hold-down weight 76 in that it remains centrally positioned over the stack of newspapers 2 in the magazine 78, irrespective of the height of the stack.

Still another modified hold-down weight is illustrated in Figs. 6 and 7, comprising one or more flat bars 108 connected to a frame member or carriage 110, having upwardly extending, vertically disposed arms 112, each provided with a pair of guide or anti-friction wheels 114, adapted to move vertically in the vertically disposed guide grooves 116 in the side walls of the magazine 78. The wheels 114 produce less friction than the pins 109 of Figs. 4 and 5. This hold-down weight has the same advantage as the hold-down weight 102, and is more positive in action.

Each bar of the hold-down weight 102 has an integral, upwardly bent portion 148, corresponding to the upwardly bent portions 92 of the bars of the hold-down weight 76, for guiding the first newspaper 2, from between the conveyors 60 and 62, in between the hold-down weight 102 and the conveyor 80. A similar, upwardly bent portion 148 is provided on each bar of the hold-down weight 108.

The hold-down weight mechanism 111 of Figs. 8 and 9 is connected, at its front and rear ends, to one end of links 113, the other ends of which are connected to arms 115 that are geared together at 117. Each arm 117 is provided with a counterweight 119, that reduces the pressure on the topmost paper in the stack of papers 2 in the magazine 78 as the height of the stack increases. This results in uniform pressure between the stack 2 and the belts 80 and enables the stack of papers 2 to be released easily for delivery to the table 140. The hold-down weight mechanism 111 is provided with guide pins 123 that fit into vertically disposed slots 121 in the sides of the magazine 78 to maintain the weights 111 horizontal. This function is aided by the gear segments 117. The topmost position of the weights 111 is indicated by dotted lines in Fig. 8.

Wrapping paper is fed intermittently from a roll or reel of wrapping paper 118 that is mounted to turn upon a spindle or rod 120, disposed at the left-hand side of the machine, and a little below the magazine 78. From the roll 118, the wrapping-paper web 122 rises substantially vertically to a guide roll 124, over which it passes to the right, over a platen 126, mounted upon a platen lever 243, pivoted at 250, and under a backing plate 128 of the addressing mechanism. The platen 126 is intermittently moved upward by a cam 254 to force the interposed wrapping-paper web 122 against a type-backed ribbon 130 between the web 122 and an address plate 228 contained in a container 226. A spring 256 returns the plate 126 to its illustrated position. Different address plates 228 will thus produce different addresses and other insignia upon the web 122. The count is predetermined by peculiarities on the address plates, as explained in the said application, and there is a correlation between the predetermining means and the addressing of the stack.

At a suitable moment, the portion of the web 122 thus addressed is fed forward, to the right, between feed rolls 132 and 134. One revolution of the feed roll 132 about its shaft 133 results in feeding the required length of wrapper from the reel 118. Such revolution of the feed roll 132 will be produced after a predetermined degree of rotation of the shaft 386, as will be explained later. The web 122 is fed between a cutter bed 136 and a cutter roll 138 and, through guides 135 and 137 (Fig. 1) over to the stacker belts 80, which grip the web under the hold-down weight 76 and carry it forward to the right, stretching it taut. At the completion of the revolution of the feed roll 132, the cutter roll 138 is actuated, in synchronism with the other movements of the machine parts, to make one revolution, thereby severing the addressed portion of the web 122 from the remainder of the web. The severed portion of the web constitutes a wrapper; in the industry, it is often called a "snipe".

The wrapper, thus severed, is thereupon pulled into the magazine 78 by the belts 80, into engagement with the stops 86, and remains there until the first newspaper 2 enters the magazine 78 under the wrapper. The next-following newspapers are then fed in under this first newspaper, as before described, the wrapper remaining always at the top of the stack, under the hold-down weight 76. The name, address and other information relating to the dealer for whom the stack of newspapers 2 in the magazine 78 is about to be collected have previously been printed, as before described, on the upper side of the wrapper.

The table 140 is provided with a vertically disposed, stop wall 142 for limiting the forward movement of the newspapers.

After a predetermined number of newspapers 2 have been accumulated in the magazine 78, as determined by the counting finger 44, or the counting fingers 44 and 46, further feeding of the newspapers into the magazine 78 will automatically be stopped, as hereinafter described. The stops 86 will thereupon be turned about a rock shaft 189 to which they are rigidly attached, in opposition to the force exerted by a counterweight 157, whereupon the conveyor 80 will carry the stack of newspapers accumulated in the magazine 78, as a unit, out of the magazine 78 and on to the table 140, or the said secondary or other wrapper resting thereon. The hold-down weight 76, of course, then falls by gravity once more to the bottom of the magazine 78.

The mechanism for freeing the stops 86 is illustrated and described more particularly in the said application.

A plurality of bar supports 146, rigidly connected together upon a common frame, are normally disposed below, and between, the belts 8, as shown more particularly in Fig. 1. In such normal disposition of the supports 146, they are ineffective, and do not interfere with the feeding of the newspapers 2 out of the hopper 6 by the belts 8. The supports 146, however, may become raised, as a unit, up between the belts 8, into an effective position, thus performing a double function: first, they lift the newspapers 2 up above the belts, where they constitute a table for supporting the newspapers, so that the belts can not, further, convey the newspapers out of the hopper 6; and secondly, they close up the space under the finger 16, so that the newspapers could not any longer be fed under the finger 16, even if the belts could, otherwise, be capable of doing so.

This raising of the table supports 146 is automatically effected, immediately after every feeding of the desired, predetermined number of papers 2 out of the hopper 6, by means of long, parallelly disposed, side rods 186, pivoted at 188. The raising of the table 146 is effected by means of an eccentric 168 that is rotatably mounted upon a constantly rotated shaft 170 that is journaled in the front and rear frame plates of the machine. An eccentric strap 172, that is mounted over the eccentric 168, is integral with a depending hollow, connecting rod 174, in which is mounted a stem or plunger 176, to the lower projecting end of which the separating roll 38 is pivoted. The spring 40 is mounted in the hollow of the rod 174, in coiled form, about the upper end of the stem 176. The separating roll 38 is thus raised simultaneously with the raising of the table 146.

The side rods 186 are provided with bent, forward ends (shown by dotted lines in Fig. 8) that are pivoted at the ends of the spindle 178. The table supports 146 are secured to cross bars that transversely connect the side rods 186, through openings 181 and 190 in the side plates of the machine frame. The operations are controlled by magnets 316 and 318.

An electromagnet (not shown) may operate a shaft 386, supported in a member 258, through a single revolution to permit a spring 246, one end of which is fastened at 247 and the other end to the arm 240, to effect the actuation of a link 244 and, therefore, a cycle of movement of an address slide 232. The slide 232 is returned by a spring-loaded arm 238. The plates 228 are successively moved to the left, from underneath the addressing device 128, to a position underneath the counter and selector, at the same time that the lowermost plate 228 in the container 226 is moved under the addressing device 128, shown between the counter and the container 226. The slide 232 is provided with an upward projection 234 having an anti-friction roll 236 that may be engaged by an arm 238. The arms 238 and 240 are pivoted about a pivotal shaft 242. The arm 238 is positively actuated about the pivot 242 by means of the connecting rod 244. The plate 228 previously under the addressing device 128 is moved into the selector to control the counting off of the proper number of papers to be fed under the wrapper now in position in the magazine 78. After it has been used, the plate 228 is moved into the container 261, under a spring-pressed finger 263. The plates 228 are later removed from the container 261 for new use.

To summarize, the newspapers are held in the magazine 78 by a stop 86, and are held down by various hold-down weights, as illustrated more particularly in Figs. 2 to 9. At the end of a predetermined count, the feed of the papers 2 out of the hopper 6 is stopped, this being effected by raising the table 146 from under the belts 8 at the bottom of the hopper 6, so as to close the gap under the finger 16 of the shield 10. The stop 86 is then released to permit the belts 80 to feed the stack of the counted number of papers in the magazine 78 on to the receiving table 140, the movement of the papers on the table 140 being limited by the wall 142. A new stack of papers, corresponding to a new address plate, is then counted off.

Further modifications will occur to persons skilled in the art, and all such are considered to fall within the spirit and scope of the invention, as defined in the appended claims.

What is claimed is:

1. Apparatus of the character described comprising a frame for supporting a stack of sheets, a hold-down weight for pressing against the top of the stack, and a link pivoted at one end to the frame and at the other end to the hold-down weight.

2. Apparatus of the character described comprising a frame, a hold-down weight, a link pivoted at one end to the frame and at the other end to the hold-down weight, and means for counterweighting the hold-down weight.

3. Apparatus of the character described comprising a magazine, means for feeding articles into the magazine each below the preceding article, a hold-down weight for engaging the uppermost article in the magazine, and a link pivoted at its lower end to the hold-down weight.

4. Apparatus of the character described comprising a magazine, means for feeding articles into the magazine each below the preceding article, a hold-down weight for engaging the uppermost article in the magazine and adapted to move vertically to compensate for different heights of stacks, and means for guiding the vertical movement of the hold-down weight.

5. Apparatus of the character described comprising a magazine, means for feeding articles into the magazine each below the preceding article, a hold-down weight for engaging the uppermost article in the magazine, the hold-down weight being provided with a guide frame member adapted to move vertically, and means for guiding the vertical movement of the guide frame member.

6. Apparatus of the character described comprising a magazine, means for feeding articles into the magazine each below the preceding article, a hold-down weight for engaging the uppermost article in the magazine, the hold-down weight being provided with a guide frame member adapted to move vertically, and means for guiding the vertical movement of the guide frame member comprising rolls or wheels on the guide frame member, the magazine having guide grooves for guiding the vertical movement of the rolls.

7. Apparatus of the character described comprising a magazine, means for feeding articles into the magazine each below the preceding article, a hold-down weight for engaging the uppermost article in the magazine, and means for so counterweighting the hold-down weight as to secure a reduced pressure by the hold-down weight against the articles in the magazine as the stack of the said articles increases in height.

OTTO E. WOLFF.